Figure 1:
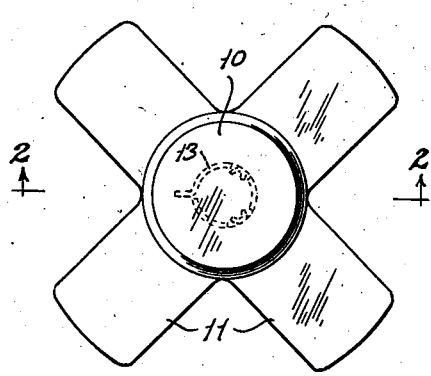

March 17, 1942.  G. A. TINNERMAN  2,276,753
FASTENING DEVICE
Filed Nov. 12, 1940

INVENTOR.
GEORGE A. TINNERMAN
BY Bates, Teare, & McBean
ATTORNEYS

Patented Mar. 17, 1942

2,276,753

UNITED STATES PATENT OFFICE 2,276,753

FASTENING DEVICE

George A. Tinnerman, Cleveland, Ohio, assignor to Tinnerman Products, Inc., Cleveland, Ohio, a corporation of Ohio Application November 12, 1940, Serial No. 365,179

10 Claims. (Cl. 287—53)

This invention relates to fastening means for securing handles or knobs to stems or tools or the like, and more particularly to a fastener which may be inserted into the handle or knob and which may then receive the stem or the like and prevent relative rotation of the parts.

In setting forth a specific embodiment of the present invention several stems are shown which are similar in form to the stems of control valves for faucets and the like and the principles of the invention find excellent practical application in this field. Such stems are conventionally provided with flutes or grooves extending parallel to their axes and while a great many different stems of this nature are offered by various manufacturers, they are found to vary throughout only a moderate range as to diameter. The various faucet valve stems also vary in the relative size and pitch of the flutes or grooves.

Heretofore, the handles which have been attached to such stems have had mating flutes or projections, these being molded or machined as an integral part of the handle or formed as a metal insert which was then either placed in the mold and thus incorporated into the handle or driven into, cemented, or otherwise secured within a bore of the handle. In the case of a handle formed of ceramic material or of synthetic resin or other plastic, the first type mentioned is usually unsuitable as the projections, which are usually of rather small cross-sectional dimensions, soon become abraded and stripped. On the other hand, the cost of molding an insert into an article of this nature is usually a very considerable part of the total manufacturing cost, due to the initial cost of machining the insert and to the complication of the mold.

The present invention contemplates the provision of a handle adapted to receive fastening means which will overcome the above named objections and an object, therefore, is to provide a handle and an insertable fastener therefor, both of which are simple and economical as to manufacture, easy to assemble, and which cooperate to form an interlocking engagement of high mechanical quality with a mating stem or the like.

In the case of the present invention, handle means are provided which may be selectively applied to any of the commercial faucet valve stems now in common use. It is to be understood that the present invention is described in connection with faucet valve stems only because such stems provide an example of the possible applicability of the teachings of the invention and many other manifestations of the invention may be produced, such as in the case of a series of screw drivers or other related tools where a single common and interchangeable handle is desirable, or, in general, wherever a sleeve is to receive a stem and be non-rotatively engaged by it.

In a preferred form the present invention comprises a handle having an opening therein for receiving one or more tubular inserts, such inserts having formed therein means for interlocking with grooves in a stem. The nature of the interlocking means of the tubular inserts is such that a single insert is effective to interlock with stems varying somewhat in diameter and in the size, arrangement and number of grooves. Nevertheless, it is desirable under certain circumstances to provide several co-axial inserts arranged end to end with the smallest insert occupying an innermost position in the handle and the largest positioned adjacent the outer end of the opening in the handle.

The present invention provides means whereby handles formed of synthetic resins and other modern plastics may be quickly and easily applied to faucet valve stems, either as original equipment or as replacements for porcelain or other handles which may have become broken or which are outmoded. The far lower thermal conductivity of handles formed of plastic material, as compared with metal and other handles, gives further advantage to the employment of the principles set forth herein. A feature of the invention resides in the fact that handles constructed in accordance with the teachings thereof may be quickly and easily attached to or removed from conventional fluted stems without the use of tools of any kind, special or otherwise.

Figure 2:
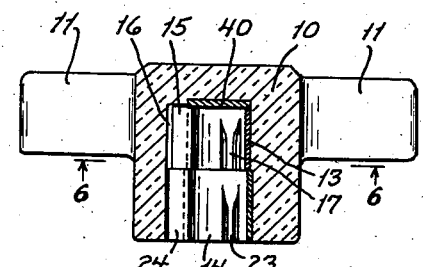
Figure 3:
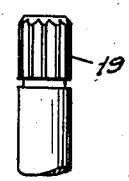
Figure 4:
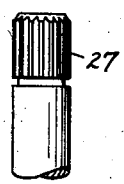
Figure 5:
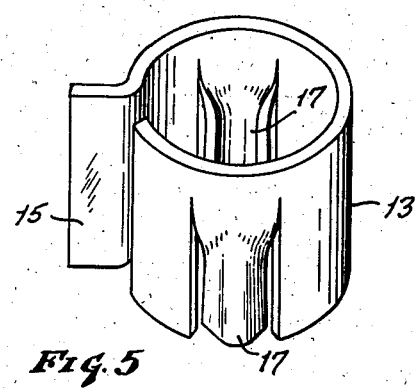
Figure 6:
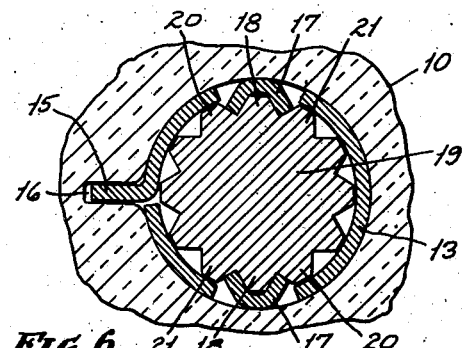
Figure 7:
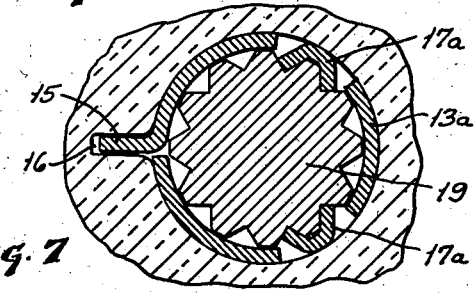
Figure 8:
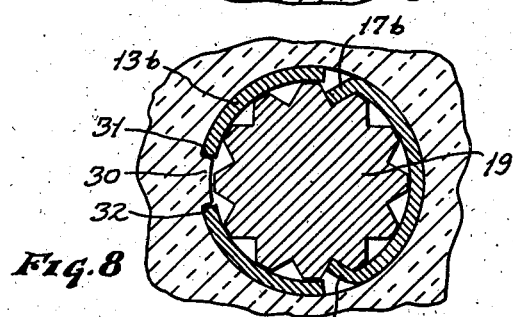

In the accompanying drawing which depicts the invention in exemplary form, Fig. 1 is a top plan view of a control handle constructed in accordance with the principles of the invention; Fig. 2 is a cross sectional view taken on the plane 2—2 in Fig. 1; Fig. 3 is a fragmentary view of a fluted stem or shank adapted to be received by the handle of Fig. 2; Fig. 4 is a similar view of another form of fluted stem or shank; Fig. 5 is a perspective view of the tubular insert; Fig. 6 is a transverse cross section taken on line 6—6 of Fig. 2; Fig. 7 is a similar view of a modified form of insert; and Fig. 8 is a similar view of a second modified form of insert.

In the drawing and throughout this specification like characters of reference denote like parts and the numeral 10 designates the hub portion of a handle element which may, in certain forms of the invention, include radiating arms 11 to facilitate manipulation thereof. The hub portion 10 is provided with an axial opening for receiving one or more tubular inserts. In the illustrated instance two such inserts are provided and they are designated generally 13 and 14, respectively.

Referring particularly to Figs. 5 and 6, and to the insert designated 13, which occupies an innermost position with respect to the opening in the hub portion 10 of the handle element, it is noted that such insert may be conveniently formed from sheet metal whereby a terminal portion of the blank may be utilized as a keying flange 15, such flange being adapted to be disposed in a similarly formed lateral recess 16 in the opening in the hub portion 10. It is preferred that the tubular inserts be formed of resilient metal so as to be sprung into position and there maintain themselves, and, due to its non-corrosive qualities, phosphor bronze has been found best suited as a material when handles for plumbing fixtures are under consideration. The main tubular portion of the insert 13 is provided with a pair of parallel slits which in the present instance are pictured as extending from the outer end of the insert to a point short of the other or inner end of the insert. An ear or prong 17 is thereby formed and such ear or prong is provided with a V-shaped transverse cross section as appears clearly from the detailed cross section, Fig. 6. This prong may project beyond the outer cylindrical surface of the insert before assembly and thus assist in binding the insert within the bore of the handle.

From Fig. 6, it will likewise be seen that upon assembly a ridge 18 of a fluted stem 19 is embraced by the ear or prong 17 while the longitudinal edges of the latter engage against the faces of ridges 20 and 21 lying at opposite sides of the ridge 18. It is to be understood that the insert 13 is embraced by the opening in the hub portion 10 of the handle element in such a way that it cannot spread outwardly and consequently rotation of the stem 19 in a clockwise direction as viewed in Fig. 6 is positively prevented by jamming of the face of the ridge 20 against the abutting edge of the ear or prong 17. Relative counterclockwise rotation of the stem 19 with respect to the sleeve 13 is prevented by engagement of the face of the ridge 21 against the abutting edge of the ear or prong 17.

It will be noted that the second tubular insert 14, which is disposed outwardly of the insert 13, is slightly larger in diameter and also is provided with ears or prongs designated 23. The ears or prongs 23 are the same in general as the ears or prongs 17 of the tubular insert 13 but are narrower and consequently somewhat shallower. The insert 14 is preferably provided with a lateral keying flange 24 which is similar to the figure 15 of the insert 13.

In Fig. 4 there is shown a stem or shank 27 which has at its end a series of grooves or flutes extending longitudinally of the stem. The stem or shank 27 is slightly larger in diameter than the stem or shank 19 and happens to have a greater number of grooves or flutes. This means that the individual grooves or flutes are consequently smaller in transverse section. The stem 27 would, upon assembly in the handle element 10, enter only the outer tubular insert 14, being stopped from further entry by the smaller diameter of the tubular insert 13 and the greater size of its ears or prongs 17. The fluted end of the stem 19, on the other hand, would slip somewhat loosely through the tubular insert 14 and into interlocking engagement in the inner tubular insert 13.

The greater cross sectional size of the ears or prongs 17 of the inner tubular insert 13 increase the range of sizes of valve stems which may be interlockingly received therein. Such increase in range affects the lower limit of stem sizes which may be accommodated since with the larger ears or prongs 17 the outside diameter of the stem to be received may be somewhat smaller than the principal inside diameter of the tubular insert 13, the longitudinal edges of the ears or prongs 17 nevertheless engaging faces of the ridges of the valve stem or shank.

In the illustrated embodiment the provision of two diametrically opposite ears or prongs 17 on the inner insert 13 is contemplated. Likewise the outer tubular insert 14 has a pair of ears or prongs 23. It will be seen, however, that this number may be varied to suit various conditions. Also, it will be seen that the prongs 17 need not be diametrically opposite each other but can be disposed variously throughout the body, nor need they extend to the lower edge of the body. For instance, in the embodiment of Fig. 7, two prongs 17a of an insert 13a are illustrated closer together than those in Fig. 6 for greater inherent strength in the insert itself, better performance under localized stresses in use, or for other reasons.

The means for preventing rotation between the handle and insert may also take various forms within the contemplation of this invention. In the embodiment of Fig. 8, for example, a somewhat simpler construction is obtained by providing a longitudinal projection or key 30, in the bore of the handle, which is engaged by the terminal edges 31 and 32 of the insert 13b, thereby to effectively prevent relative rotation.

It is also within the scope of this invention to form the prongs as illustrated in Fig. 8 where the two inturned portions 17b may be regarded as the edges of a prong of considerably greater width than those previously illustrated or as two prongs of simpler form.

The nature of the disposition of the tubular inserts in the hub portions 10 of the handle element is such that great structural strength of the handle element and the hub portion thereof is not essential and such handle element and hub portion may be integrally molded of plastic material of any suitable kind and in a pleasing variety of colors.

The manner of engagement of the tubular insert with the flutes of the stem or shank, being along longitudinal lines extending for a major portion of the length of the insert, substantially prevents the possibility of wiggling or wobbling of the handle with respect to the stem when in assembled position.

In the handle element illustrated a disc 40, see Fig. 2, is disposed in the inner end of the opening in the hub portion 10. This form of the invention contemplates the utilization of a handle element formed of a transparent or translucent plastic or other material and the disc 40 may be colored, configured or otherwise provided with a symbol or symbols for indicating the nature of the thing which is controlled by the handle. For instance, a pair of handle elements might be provided, one with a red disc and the other with a blue disc, for indicating that the handle members are hot and cold water controls, respectively. The disc may either be forced into position or be retained in position by engagement of the tubular insert.

While specific embodiments of the principles of the present invention are illustrated and described in detail, it is to be understood that the invention is not limited thereby or otherwise than as defined in the appended claims.

I claim:

1. Means for axially engaging a sleeve and a fluted stem against relative rotation, such means comprising a tubular insert disposed in a cylindrical opening in an end of said sleeve, means for preventing rotation of said insert in said sleeve, and a pair of spaced, parallel longitudinal slits in said insert extending from one end part way only to the other end to produce flexible fingers integral with the body of the insert, said fingers being V-shaped in transverse cross section with the terminal portions of said V-shape directed inwardly for engagement with a fluted stem.

2. Means for axially engaging a sleeve and a fluted stem against relative rotation, such means comprising a tubular insert disposed in a cylindrical opening in an end of said sleeve, means for preventing rotation of said insert in said sleeve, and a pair of spaced, parallel longitudinal slits in said insert extending from one end part way to the other, one edge portion adjacent one of the slits being directed obliquely inwardly to provide an edge for abutment against the face of a ridge of a fluted stem, and the opposite edge portion adjacent the other slit being directed obliquely inwardly to bear against an opposite face of a ridge of the fluted stem.

3. Means for axially engaging a sleeve and a fluted stem against relative rotation, such means comprising a tubular insert disposed in a cylindrical opening in an end of said sleeve, means for preventing rotation of said insert in said sleeve, and a pair of spaced parallel longitudinal slits in said insert extending from one end part way to the other, the portion of the insert lying between said slits being V-shaped in transverse cross section to present a pair of inwardly directed diverging portions terminating in oppositely directed clutch faces for engagement with oppositely disposed faces of the ridges of a fluted stem.

4. Means for axially engaging a sleeve and a fluted stem against relative rotation, such means comprising a tubular spring metal insert disposed in a cylindrical opening in an end of said sleeve, means for preventing rotation of said insert in said sleeve, and a pair of spaced, parallel longitudinal slits in said insert extending from one end part way to the other, the metal between said slits being V-shaped in transverse cross section with the terminal portions of said V-shape directed inwardly for engagement with a fluted stem.

5. Means for axially engaging a sleeve and a fluted stem against relative rotation, such means comprising a tubular insert formed of spring metal and disposed in a cylindrical opening in an end of said sleeve, means for preventing rotation of said insert in said sleeve, and a pair of spaced, parallel longitudinal slits in said insert extending from one end part way to the other, one edge of the metal adjacent one of the slits being directed obliquely inwardly to provide an edge for abutment against the face of a ridge of a fluted stem, and the opposite edge of the metal adjacent the other slit being directed obliquely inwardly to bear against an opposite face of a ridge of the fluted stem.

6. A fastener comprising a one-piece split tubular body of sheet material, having a pair of slits extending longitudinally and from one end thereof part way to the other, the body having a portion thereof adjacent each slit turned inwardly to provide two shoulders facing in different directions, said shoulders being adapted to engage an article which extends into the body and to lock the fastener to the article.

7. A replacement handle for faucets and the like comprising a body of plastic material with an axial bore partially therethrough, an insertable bushing in said bore providing a pair of oppositely facing abrupt flanges each made by a turned-in portion of the body of the bushing adjacent a slit extending part way only from one end of the bushing, said flanges being longitudinally disposed inwardly in said bore and adapted to contact with complementary longitudinal grooves on a faucet valve stem to lock said handle and stem for simultaneous turning movements while permitting ready attachment and detachment of said handle from said stem by longitudinal axial movement of said handle relative to said stem under impetus of the hand of the operator.

8. A fastener comprising a one-piece tubular body of sheet material having slits extending part way from one end and adjacent the slits turned inwardly and extending in different directions, and providing abrupt shoulders for engaging an article that extends into the body, and said body having a tongue extending outwardly therefrom for engaging an article into which the fastener may be positioned, whereby the fastener operates to lock the two articles together against rotation with respect to each other.

9. The combination of a handle for turning a stem and interconnecting means therefor, said handle comprising a body of plastic material with an axial bore partially therethrough, said interconnecting means comprising a tubular body of spring metal insertable in said bore and adapted to receive said stem, said handle and interconnecting means having substantially radial shoulders engaging each other to key such parts together; a pair of longitudinal slits in said tubular body extending from one end part way to the other end, one edge of the metal adjacent one slit being bent obliquely inwardly to provide an edge for abutment against a face of a groove in the stem, and the opposite edge of the metal adjacent the other slit being bent obliquely inwardly to bear against an opposite face of a groove in the stem to thereby prevent relative rotation in either direction.

10. The combination of a fluted stem, a handle for turning it, and interconnecting means between the two, said handle comprising a body of plastic material with an axial bore partially therethrough, said interconnecting means comprising a tubular body of spring metal insertable in said bore, and having pairs of longitudinal slits comparatively close to each other and extending from one end part way to the other end of the insertable means to provide flexible spring fingers, the opposite edge of each finger being turned inwardly to provide abutments to coact with the ribs and grooves of the fluted stem.

GEORGE A. TINNERMAN.